Nov. 19, 1935.  J. E. ALM  2,021,164

ELECTRIC ROTARY MACHINE SYSTEM

Filed March 10, 1933  6 Sheets-Sheet 1

INVENTOR
Johan Emil Alm
BY
ATTORNEY

Nov. 19, 1935.    J. E. ALM    2,021,164
ELECTRIC ROTARY MACHINE SYSTEM
Filed March 10, 1933    6 Sheets-Sheet 2

INVENTOR
Johan Emil Alm
BY
ATTORNEY

Nov. 19, 1935.   J. E. ALM   2,021,164
ELECTRIC ROTARY MACHINE SYSTEM
Filed March 10, 1933   6 Sheets-Sheet 3

INVENTOR
Johan Emil Alm
BY
his ATTORNEY

Nov. 19, 1935.                J. E. ALM                2,021,164
                    ELECTRIC ROTARY MACHINE SYSTEM
                  Filed March 10, 1933      6 Sheets-Sheet 4

Nov. 19, 1935. J. E. ALM 2,021,164
ELECTRIC ROTARY MACHINE SYSTEM
Filed March 10, 1933   6 Sheets-Sheet 5

Nov. 19, 1935.  J. E. ALM  2,021,164

ELECTRIC ROTARY MACHINE SYSTEM

Filed March 10, 1933   6 Sheets—Sheet 6

INVENTOR
Johan Eric Alm
BY
ATTORNEY

Patented Nov. 19, 1935

2,021,164

UNITED STATES PATENT OFFICE 2,021,164

ELECTRIC ROTARY MACHINE SYSTEM

Johan Emil Alm, Stockholm, Sweden, assignor to Baltzar Carl Von Platen, Stockholm, Sweden Application March 10, 1933, Serial No. 660,247
In Sweden March 22, 1932

34 Claims. (Cl. 171—123)

The present invention relates to electrical systems comprising rotary machines of the heteropolar type having open-coil armature windings and continuously energized main poles. By heteropolar machines is meant machines in which consecutive field poles are unlike, i. e. alternately of north and south polarity.

The invention is of particular interest in systems comprising a number of transformers having primary and secondary windings and a separate excitation generator of heteropolar type for the supply of the necessary excitation energy to the transformers so as to induce mutually phase displaced voltages in said windings which latter each cooperate with one commutator and auxiliary commutation means, such as a separate commutation generator, in such a manner that each winding is periodically short-circuited during definite time intervals during which the current is commutated and the voltage rectified, the different rectified pulsating voltages of the primary and/or secondary side being connected through the associated commutators to produce a primary and/or secondary continuous voltage. A system of the above described type is to be found for example in the U. S. Patent No. 1,941,644.

In such systems it is often of importance to prevent or at least to counteract leakage of the magnetic induction flux in the pole spaces which phenomenon is likely to render impossible the production of certain wave forms of the induced electromotive forces. In addition to the leakage, the wave form is also influenced by the magnetic field caused by the magnetomotive force of the armature winding, or the so-called armature reaction, and the invention has also for its object to counteract or prevent the disturbance caused thereby.

The invention consists substantially in the provision of a number of auxiliary poles of magnetic material disposed between the main poles of the machine, said auxiliary poles being stationary in relation to the main poles.

The invention will be more closely described in the following with reference to the accompanying drawings.

In the accompanying drawings

Figures 1, 1A:
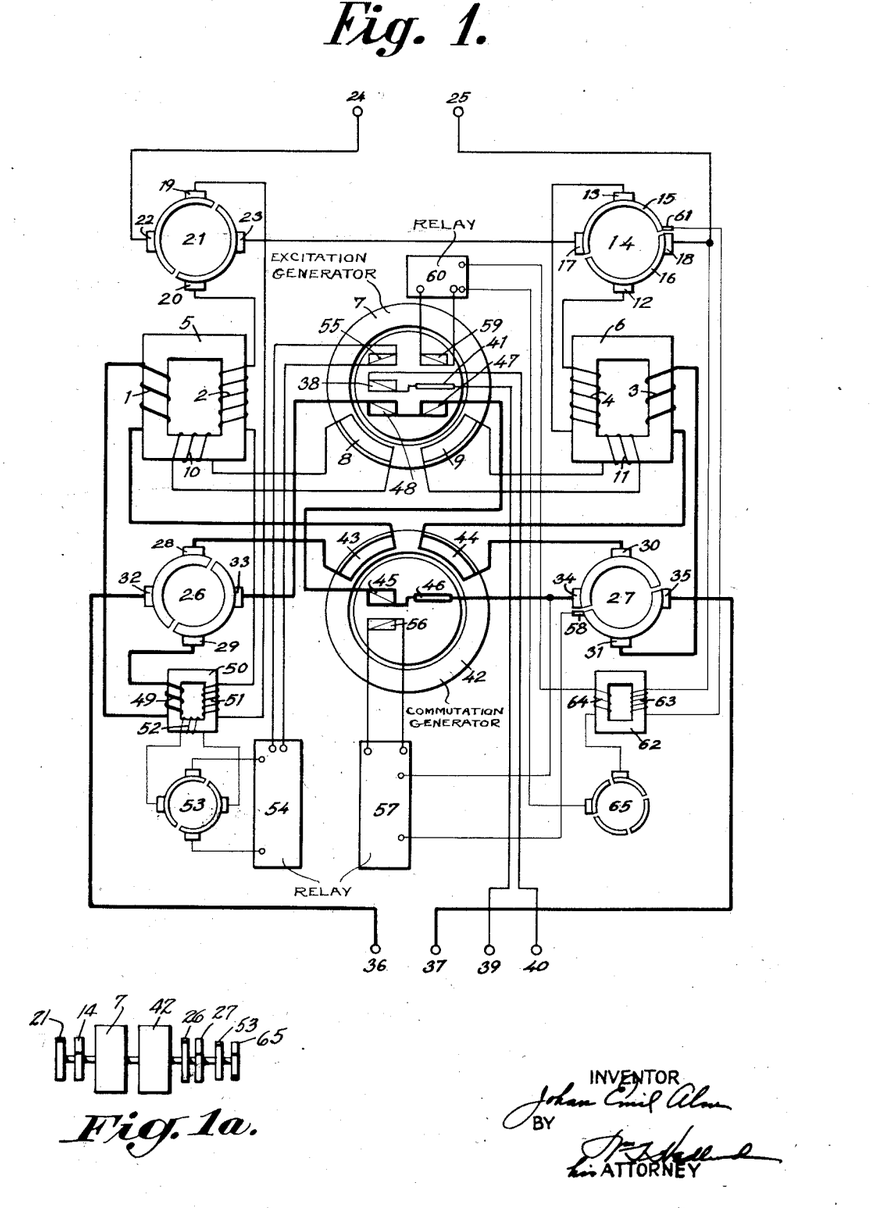
Figure 1 is a schematic diagram of one embodiment of the invention.
Fig. 1a is a diagrammatical showing of certain of the elements of Fig. 1 mounted for synchronous rotation.

Figure 1 shows a direct current converter system comprising a number of transformers 5, 6 having primary and secondary windings 1 to 4, and a separate excitation generator 7 of heteropolar type for supplying the necessary excitation energy to the transformers 5 and 6. For this purpose the excitation generator 7 is provided with two induced windings 8, 9 in which mutually phase displaced alternating voltages are induced and which feed special windings (tertiary windings) 10, 11 disposed on the transformers whereby corresponding voltages are induced in the primary and secondary windings 1—4 of the transformers. Instead of providing separate energization windings in the form of tertiary windings on the transformers it may be advantageous to connect the windings 8 and 9 directly to the primary windings 1 and 3 of the transformers or, in certain cases, to the secondary windings 2 and 4 of the transformers. In the following, however, reference is made to the embodiment having tertiary windings for the reason that the operation of this arrangement is more readily understood.

The secondary winding 4 of the transformer 6 is connected with two diametrically opposite brushes 12 and 13 and a commutator 14 having the segments 15, 16. The commutator 14 further cooperates with a pair of brushes 17, 18 which are displaced 90° in relation to the pair of brushes 12, 13. Provided the commutator is so mounted or driven in relation to the excitation generator 7 that for each cycle of the alternating voltage induced in the winding 4 by the winding 9 through the intermedium of the winding 11 the commutator 14 rotates half a revolution, the alternating voltages will be converted into rectified voltage impulses between the brushes 17 and 18, it being understood that said brushes are connected alternately with the brushes 12 and 13 during the rotation of the commutator. It is assumed that the rectification of the alternating voltages, or the commutation of the currents at load, will take place each time one of the brushes 12, 13, 17, 18 short-circuits the two segments 15, 16 which takes place four times for each revolution of the commutator.

Also the secondary winding 2 of the other transformer communicates with the brushes 19 and 20 of another commutator 21 of similar design as the commutator 14. In similarity with the conditions in the commutator 14 rectified voltage impulses are obtained between the brushes 20 and 23 provided the commutator 21 is synchronized with relation to the winding 8 of the excitation generator 7. On the assumption that the windings 8 and 9 have a mutual phase displacement of, for instance, 90 electrical degrees and the commutators 14 and 21 are correspondingly adjusted, the full voltage amplitude will be obtained between the brushes 22 and 23 while there is zero voltage between the brushes 17 and 18 and vice versa. At a suitable selection of the wave form of the voltages induced in the transformers it is possible to obtain a continuous voltage between the terminals 24 and 25 through series-connection of the brushes 18, 17, 23 and 22. A similar commutator connection is previously described in the U. S. Pat. No. 1,916,240. Compare also Figure 2 of the U. S. Pat. No. 1,941,644.

Also the primary windings 1 and 3 of the transformers cooperate with two commutators 26, 27, the terminals of the winding 1 being connected with a brush couple 28, 29 of the commutator 26 whereas the winding 3 is connected with another brush couple 30, 31 of the second commutator 27. The latter commutators have also brush couples 32, 33 and 34, 35 respectively disposed at an angle of 90° to the brush couples 28, 29 and 30, 31 respectively. Also these commutators are synchronized with the electromotive forces induced in the associated windings and, in accordance therewith, mutually displaced 90 electrical degrees, corresponding to 45 mechanical degrees. The brushes 32, 33 and 34, 35 are mutually series connected to a source of continuous voltage represented by the terminals 36, 37. The synchronism between the generators and the various commutators may be obtained by arranged generators 7 and 42 and commutators 14, 21, 26, 27, 53 and 65 for synchronous rotation, as by mounting them on the same shaft, as is shown diagrammatically in Fig. 1a.

This system is intended to operate in such a manner that upon impressing a continuous voltage on the terminals 36, 37 said voltage is decomposed or split-up by the commutators 26, 27 into a two-phase alternating current. The voltage of the alternating currents is then altered by means of the transformers 5 and 6 and rectified through the commutators 14, 21, to a continuous voltage between the terminals 24, 25 of a voltage other than that impressed upon the terminals 36, 37. It has above been assumed that reversal will take place both on the primary and secondary sides while the corresponding commutator is short-circuited. To facilitate this the alternating voltage induced in the transformers should have definite zero voltage intervals and also a wave form suitable for the purpose. Also the excitation generator 7 must feed the tertiary windings 10, 11 with a voltage of a corresponding wave form. For this purpose the main poles of the generator 7 are so shaped and energized by means of an excitation winding 38 disposed thereon and fed from a separate current source 39, 40, that the desired result is obtained so far as possible.

As the excitation current in the windings 10 and 11 is displaced in phase nearly 90° in relation to the impressed voltage it is readily understood that an insignificant or no current will pass through those of the armature windings of the generator 7 which in a definite moment are positioned opposite the main poles whereas windings associated with the other phase and, at the moment in question being between the main poles carry full excitation current. The latter windings cause accordingly a magnetomotive force which on the one hand, has a pure counter-magnetizing action and, on the other, will distort the main flux of the machine, being opposite the pole space between the main poles.

Figure 2:
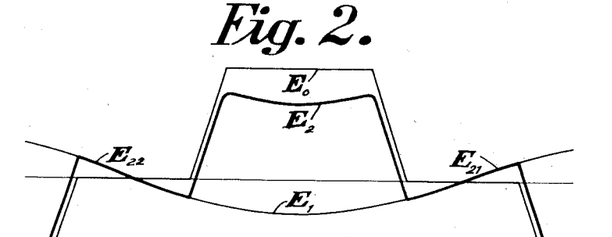
Figures 2 to 6 show different curves illustrating the operation thereof.

Said conditions are illustrated in Figure 2 where $E_0$ designates the voltage induced by the main poles of the excitation generator which voltage in the following will be termed "main voltage" for the sake of briefness. The magnetomotive force caused by the load current of the armature winding, i. e. by the excitation currents of the transformers, which is displaced in phase ninety degrees in relation to the main voltage and the fundamental wave of which is stationary in relation to the poles, causes an additional voltage $E_1$. By adding or superposing the two voltages $E_0$ and $E_1$ the resulting voltage $E_2$ is obtained in the excitation generator 7 at load. By adjusting the excitation of the main poles the middle portion of the curve may obviously be made to conform with the $E_0$-curve. In the intermediate portions $E_{21}$ and $E_{22}$ a distortion of the curve will, however, take place which renders it impossible to obtain the desired zero-voltage intervals. To prevent this deformation of the airgap induction curve and, accordingly, of the induced voltage, special auxiliary poles are disposed between the main poles. Such auxiliary poles may have a two-fold object. On the one hand, the auxiliary pole absorbs in its capacity of "shielding pole" any undesirable straying of the main field at the edges of the main pole out to the armature surface lying in the pole space so that zero-voltage intervals of desired duration are obtained. On the other hand, it is possible to bring about a compensation of the above mentioned distortion of the wave form caused by the magnetomotive force of the armature winding through the disposition of suitable compensation windings 41 on the auxiliary poles. Because the current passing through the armature windings of the generator is an excitation current of the transformers, it is a function of the induced voltage which is in turn determined by the excitation winding 38. It is therefore preferable to pass the same current through the compensation winding 41 as through the excitation winding 38 of the main pole according to Figure 1.

Through the above described dispositions it is possible to maintain nearly correct values of the induced voltages at no load, the rectification of the voltages being practically sparkless. The conditions will, however, change to a considerable degree at load. The commutation is highly impeded by the fact that the currents do not reverse voluntarily in the short circuited windings on account of inductances of different kinds included therein. In addition there are drops of voltage between different points in the system whereby the voltages induced by the excitation generator do not correspond to the requirements. The additional dispositions necessary to counteract such disturbances will now be described.

A commutation generator 42 (Figure 1) is provided with two induced windings 43 and 44 which are included in the primary circuits of the transformers 5 and 6. The commutation generator of the heteropolar type is provided with a number of main poles having excitation windings 45. The commutation generator is synchronized in relation to the excitation generator 7 and so disposed that it induces auxiliary voltages of short duration in the primary circuits during those intervals when the commutators 26, 27 short circuit the associated windings. Such auxiliary voltages should have such a direction, amplitude, and duration that the current in the short-circuited winding is compelled to reverse or commutate from its full amplitude in the one direction and to its full amplitude in the opposite direction before the end of the short circuit period. The auxiliary voltages required for this purpose will obviously be proportional to the current to be commutated in each instance.

Figures 3, 4:
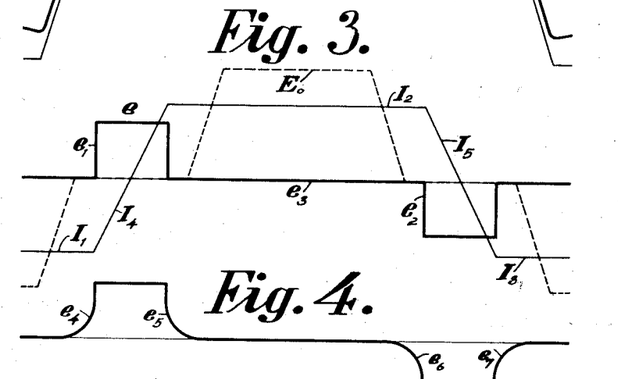

The conditions are illustrated in Figure 3 where $E_0$, as in Figure 2, designates the wave form of the so called main voltage. Prior to the first commutation shown on the drawings the current has the amplitude $I_1$ and subsequent to the first commutation the amplitude $I_2$. After a second current reversal the amplitude $I_3$ is reached. It is assumed that the current reversal is "rectilinear", i. e. follows the lines $I_4$ and $I_5$ between the full current amplitude in the one direction to the full amplitude in the opposite direction. To enforce such a commutation procedure at a given inductance of the short circuited winding the voltage induced by the commutation generator should follow the curve $e$ comprising rectangular portions $e_1$ and $e_2$ and intermediate zero voltage zones $e_3$. The height of the rectangles $e_1$ and $e_2$ is, of course, directly proportional to the load current to be commutated. For this reason the main poles 43 should be energized by a current proportional to the current in the induced windings 43 and 44, i. e. also to the primary direct current. The winding 45 is therefore preferably series-connected with the primary direct current circuit, for instance between the brushes 33 and 34.

If the poles of the commutation generator for the purpose of obtaining the desired wave form of the induced voltage are disposed with a constant air gap and an effective width corresponding to the duration of the rectangles $e_1$ and $e_2$ the field or voltage curve shown in Figure 4 will, however, be obtained at no load and separate excitation. The transitional portions $e_4$, $e_5$ and $e_6$, $e_7$ will not be vertical but have a shape diagrammatically indicated in the figure depending upon the leakage of the induction flux from the pole edges into the pole space. This phenomenon is of the same kind as has been above described in connection with the excitation generator. Such a leakage reduces the durability of the zero voltage periods $e_3$ in Figure 3 and may, if considerable, result in the disadvantage that the voltage of the commutation generator will not cease before the main voltage $E_0$ has begun to rise. In the latter case no resulting zero voltage intervals are obtained which will cause disturbances in machines of the kind in question. According to the invention auxiliary poles, or shielding poles, are therefore disposed between the main poles of the commutating generator. The design of these auxiliary poles will later on be explained more in detail. It is thereby rendered possible to obtain a pronounced transition between the nearly rectangular portions and the zero voltage portions of the $e$-curve.

Figure 5:
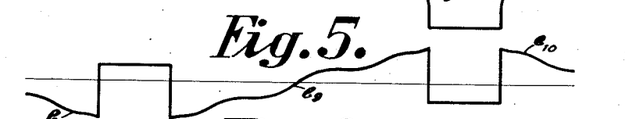

The commutation generator 42 must, as mentioned above, rotate synchronously with the other elements in the system. It should, however, be observed that the object of the main poles is to induce voltages just during those intervals when the main voltages of the transformers 5 and 6 are zero. This means in other words that the main poles of the commutation generator are displaced ninety electrical degrees in relation to the main poles of the excitation generator 7. As a consequence, the magnetomotive force caused by the armature windings 43 and 44 on account of the load current has its maximum amplitude when the appertaining armature winding takes up a position between two main poles in the commutation generator 42. The fundamental wave of the magnetomotive force of the armature windings, being stationary in relation to the poles, has accordingly a purely counter-magnetizing action. If a commutation generator having shielding poles is driven at load while its main poles are series-energized, the voltage diagram in Figure 5 is obtained. As will be seen from this figure the magnetomotive force of the armature winding having its magnetic axis at the centre of the main poles of the commutation generator, causes a distortion of the zero voltage zones so that the voltage curve will follow the curve portions $e_8$ to $e_{10}$ in Figure 5. The latter portions will generally also be sinuous depending upon the fluctuations in the effective air gap between stator and rotor caused by the slots of the armature winding, the influence of higher harmonics in the resulting magnetomotive force of the armature winding, et cetera. To avoid such deformations of the voltage wave form of the commutation generator the auxiliary poles disposed between the main poles are provided with a compensation winding 46, Figure 1. This compensation winding should preferably be passed by a current proportional to the load current in the induced windings 43 and 44 and may thus also be included in the primary circuit, for instance in series with the winding 45. For the attenuation of the higher harmonics in the voltage caused by the higher harmonics of the magnetomotive force of the armature winding, said auxiliary poles should preferably be provided with damping devices of suitable kind, such as copper plates, squirrel cage windings, or the like.

As the secondary circuits through the transformers 5, 6 are magnetically coupled with the primary circuits it would appear probable that the enforcing of a correct commutation on the primary side by means of the commutation generator 42 would be sufficient to cause a satisfactory commutation also on the secondary side.

Figure 6:
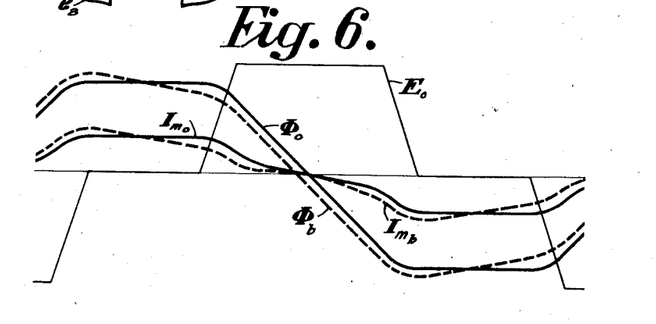

This is, however, correct only on the assumption that the primary and secondary currents vary exactly simultaneously and in opposite directions. To render this possible without any auxiliary means the magnetic circuits of the transformers must necessarily be ideal, i. e. have an infinitely great permeability so that the excitation current necessary to produce the main flux is equal to zero. This is, however, not the case in practice and a displacement in the primary and secondary current curves from their mutual ideal positions due to the influence of the excitation current must actually be reckoned with. As this fact is of disadvantage for the current reversal or commutation the excitation generator 7 has thus been introduced in Figure 1, the purpose of which generator is to deliver the current necessary for the excitation of the transformers and thus release the operative windings 1, 2 and 3, 4 respectively and the commutators associated therewith from said current. This must, however, take place not only at no load but also at load. At no load it is sufficient that the voltage curve of the excitation generator and also its air gap induction curve have the trapezoidal form shown in Figures 3 and 6 whereby the rectification of the alternating voltages to a constant continuous voltage is rendered possible. A similar counter-electromotive force will then also be induced in the transformer windings. If the curve $E_0$ in Figure 6 represents this electromotive force the induction flux must, according to the general theory of electromagnetic induction, vary at no load according to the curve $\phi_0$ in the same figure. The excitation current required for this flux depends upon the magnetic properties of the iron core and may at no load be represented by the curve $I_{m0}$. It is thus presupposed that during the zero interval the voltage induced by the main flux $\phi_0$ is equal to zero which, of course, is the case at no load. At load the voltage required for the current reversal in the windings 2 and 4 and for overcoming their leakage inductance must be transformed from the windings 1 and 3 and for this purpose a corresponding variation in the flux is necessary. Thus the flux must vary at load during the short-circuit period. If the excitation in its entirety still has to be delivered by the excitation generator its voltage curve must be changed to a corresponding degree. If $E_0$ represents the voltage induced in the transformer, in conversion from direct current of low tension to such of high tension, the windings 2 and 4 constitute the high tension windings and then the curve I for the load current to be commutated lies in phase with the voltage $E_0$, Figure 3. The total commutation voltage required for the commutation is represented by the curve $e$ in Figure 3. If the magnetic energy required for the current reversal is approximately equal in the primary and secondary circuits, about one half of the total commutation voltage is required for the current reversal on the primary side and the rest will have to be transferred to the secondary side by means of the transformers. The voltage to be induced in the windings by the main flux in the transformers for this purpose corresponds then to about one half of the commutation voltage $e$ in Figure 3. From the above the amplitude of the variation in the flux at load during the commutation period may accordingly be calculated. The curve $\phi_b$, Figure 6, may designate the flux curve necessary at load and $I_{mb}$ the corresponding excitation current. In order to let the excitation generator take over entirely the excitation of the transformers at load an additional voltage must then be induced in the windings 10 and 11 during the short-circuit period, which voltage must be such as to cause the desired variation in the main flux of the transformers. This additional excitation voltage necessary at load may be induced by energizing the auxiliary poles of the excitation generator by a special winding 47, Figure 1. The winding 47 should be fed with a current proportional to the load and may thus preferably be included in series with the windings 45 and 46 or between the brushes 33 and 34 respectively.

In Figure 6 attention should be paid to the fact that the main flux of the transformer at load will have a certain phase displacement from its no load position. In another connection it will be described how this phenomenon might be utilized to adjust the commutation on the secondary side in another manner.

The fact has above been alluded to that other changes will also take place in the system at load. If, for instance, a constant continuous voltage is impressed upon the terminals 36, 37 the secondary output voltage at the terminals 24, 25 must be somewhat reduced at load on account of the ohmic voltage drops in the system. To cause the electromotive forces of the transformers to vary in conformity herewith at load the main poles of the excitation generator 7 are also provided with an additional excitation winding 48 having such a winding direction that the magnetic winding 38 is counteracted to a suitable degree. As this variation should be proportional to the load also the winding 48 is preferably connected in series with the other windings 47, 45, 46.

It is, however, difficult to adjust the entire system in advance in such a manner that it will operate perfectly at a fluctuating load. It will therefore in most cases be necessary further to adjust the action of the different auxiliary windings in a manner more closely described in the following. If by way of example, the voltage delivered by the excitation machine 7 to the windings 10 and 11 of the transformers 5 and 6 does not exactly correspond to the excitation requirements, the machine 7 will deliver or absorb active current depending upon its voltage being too high or too low. This means that the machine will deliver or absorb respectively a part of the load current. As a consequence, the primary and secondary load ampere turns of the windings 1, 2 and 3, 4 respectively will no longer be equal and opposite. This deviation from normal conditions may be utilized to restore the correct excitation in the following manner. The primary winding of the transformer is series connected with the primary winding 49 of a differential transformer 50, the secondary winding 51 of which is series connected with the secondary winding 2 of the transformer 5. The number of turns of the winding 49 is in the same relation to the number of turns of the winding 51 as the primary winding turns of the transformer 5 is related to its secondary winding turns. Normally the ampere turns of the windings 49 and 51 counteract each other completely whereas upon an incorrect excitation voltage of the excitation generator 7 a differential flux component is caused in the core of the transformer 50 which in turn induces an alternating voltage in a tertiary winding 52 disposed on the iron core of the transformer. This alternating voltage may be rectified by means of the commutator 53 whereupon the rectified impulses are delivered to a relay 54 having for its purpose to amplify the impulses so that a direct current of sufficient strength is obtained. This current is conducted through an additional excitation winding 55 disposed on the main poles of the excitation generator. At a correct selection of the winding direction of the winding 55 and of the degree of amplification of the relay 54 it is possible to restore the energization of the transformers to its correct value. A circuit arrangement of a similar nature is described in the U. S. Pat. No. 1,941,644, Figure 3. A relay of a suitable design is described for example in the U. S. Pats. Nos. 1,943,904 and 1,943,905. Also relays of other kinds, such as electromechanical relays, may be used provided they are so designed that they respond differently to rectified voltages of different signs. It is also possible to improve the operation by including differential transformers in more than one phase and for instance series-connect the rectified voltage impulses.

In connection with Figure 6 it has been set forth that a certain phase displacement of the main flux and of its excitation current is necessary at load whereby the excitation current will contain also a certain active component in relation to the main voltage $E_0$. Particularly in small machines it is therefore possible to omit the winding 47 of the excitation generator 7 and instead adjust slightly the winding turns of the transformers 50 in such a manner that the primary current in the winding 1 is allowed to contain this additional active or watt component. Tests have verified that in this manner a satisfactory commutation will be obtained simultaneously on the primary and on the secondary sides.

The necessary commutation voltages induced by the commutation generator 42 may also be adjusted by means of a special excitation winding 56 disposed on the main poles of the commutation generator which winding is controlled by a relay 57 of similar kind as the relay 54. This relay may in turn be controlled by impulses tapped off between the brush 34 of the primary commutator 27 and an auxiliary brush 58 disposed quite closely thereto. At a complete commutation there will be practically no voltage between the main brush 34 and the auxiliary brush 58. As soon as the commutation is unsatisfactory there is a tendency to sparking at the trailing brush edge and an intermittent rectified impulse will occur between the brushes 34, 58 which impulse is utilized in the relay 57. This relay converts the impulse to an amplified direct current. At a suitable adjustment of the elements 56 and 57 this current will restore the commutation voltages to such values that the commutation will be practically complete or sparkless.

It has been set forth above that the commutation of the secondary circuits is not positively governed by the commutation of the primary circuits and that it has been necessary to provide special excitation windings 47 on the auxiliary poles of the excitation generator 7 which windings adjust the excitation of the transformers 5 and 6 during those intervals when the main voltage is zero. It is, however, not always possible to obtain said auxiliary voltages exactly according to requirements at fluctuating loads. The auxiliary poles of the excitation generator 7 are therefore also provided with an additional excitation winding 59 which may be controlled by a relay 60 of similar kind as the relay 54 or other suitable design. This relay may then be controlled from the commutator of the secondary side, by way of example, by means of impulses derived from the brush 18 and an auxiliary brush 61. In many cases it may, however, be unsuitable to connect the brushes 18 and 61 directly with the relay 60, particularly at a very high secondary voltage. Then an intermediate transformer 62 may be connected into circuit, the high tension winding 63 of which communicates with the brushes 18, 61 and the low tension winding 64 of which is used for feeding the relay 60. It should, however, be noted that the impulses derived from the brushes 18, 61 have the nature of intermittent rectified voltage impulses. When such impulses pass the transformer 62 they are converted to a train of alternating voltage impulses. As the direction of the impulse is of decisive importance for the influencing of the winding 59 in the one or the other direction, it is generally suitable to include an interrupter 65 between the winding 64 and the input side of the relay 60. This interrupter is adapted only to let through the first half period of each alternating voltage impulse. At a suitable adjustment the winding 59 will in this manner neutralize the deviation from the correct commutation of the secondary commutator.

It has above been assumed that both such windings as 45, 47, and 48, directly controlled by the load, and adjusting windings 56, 59, and 55 influenced by relays are disposed on the same poles. Particularly if the machines in question are of small sizes a less number of magnet windings might be sufficient in which case for example the windings controlled by relays may be omitted. Also the commutation relays 57 and 60 may change places so that the relay 60 of the high tension commutator may act upon the winding 56 whereas the relay 57 of the low tension commutator acts upon the winding 59.

Generally, the controlling means operating the windings 55, 56, and 59 may mutually change places according to circumstances in each case.

Figure 7:
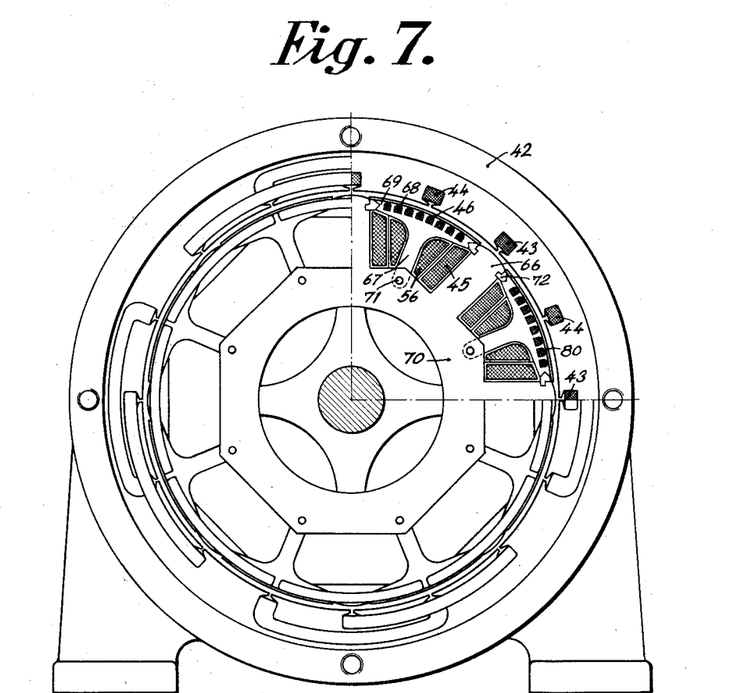
Figure 7 is an end elevation of the commutation generator included in the system shown in Figure 1.

In Figure 7 one design of the commutation generator 42 is shown as an example. The coils 43 and 44 are disposed in the stator and arranged as an ordinary two-phase winding having a phase displacement of ninety electrical degrees between the coils. The field poles 66 which in the figure are eight in number and disposed in the rotor, are comparatively narrow and have only such a width as is necessary for inducing the auxiliary commutation voltage in the coil, such as 43, short circuited for the time being. At the same time the coil 44 carries full load current. For the compensation of the component of the magnetomotive force of the stator winding, or the so-called armature reaction, which is stationary with respect to the field poles, a compensation winding 46, is disposed on the auxiliary pole 69 formed as a shielding pole, the number of conductors being so selected that the magnetomotive force caused by the auxiliary pole as far as possible neutralizes the magnetomotive force of the stator winding opposite the auxiliary poles.

The slots 68 are preferably so disposed that the magnetomotive force is nearly uniformly distributed along the pole face. The shielding poles 67 are provided with tongues secured to the common iron core 70 by bolts 71. The shielding pole serves in this case also as a holding member for the windings 45, 46 of the poles 66. It may be desirable to dispose wedges 72 of non-magnetic material between the main and auxiliary poles. By a suitable form of said wedges the mechanical strength of the rotor in regard to centrifugal stresses may be increased.

The main pole 66 may either be shaped according to the figure with an air gap increasing towards the pole tips, the wave form of the induced commutation voltage then deviating correspondingly from the rectangular form shown in Figure 3, or may have a constant air gap corresponding to a rectangular voltage curve.

To reduce as far as possible the deforming influence upon the voltage curve caused by those higher harmonics of the magnetomotive force of the stator winding which rotate in relation to the poles, damping windings 80 of a suitable kind should preferably be disposed in the auxiliary pole faces.

The pole faces of the main poles 66 may, if desired, for the same reason be provided with special damping devices. The wedges 72 of metal may for this purpose be mutually interconnected on both sides of the poles 66 so as to form a short-circuited damping circuit. The damping or attenuation must, however, not be too great as in such a case the commutation flux is unable to follow possible fluctuations in the load with a sufficient rapidity.

Figure 8:
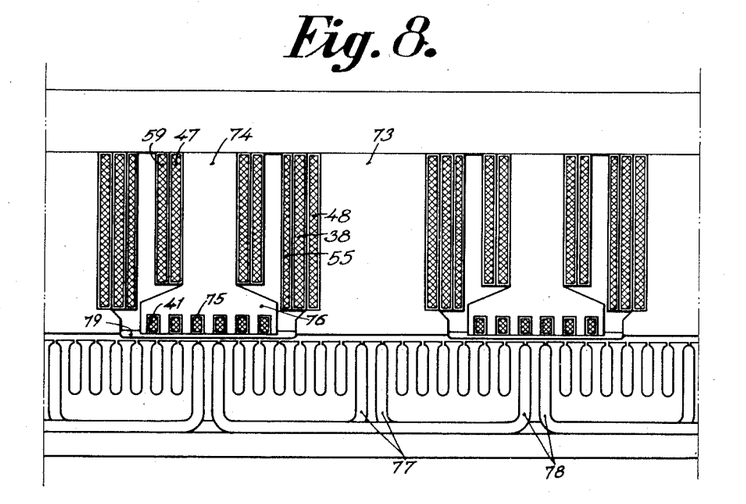
Figure 8 is an expanded detail view showing the arrangement of the field coils of the excitation generator included in the system of Figure 1.
Figure 9:
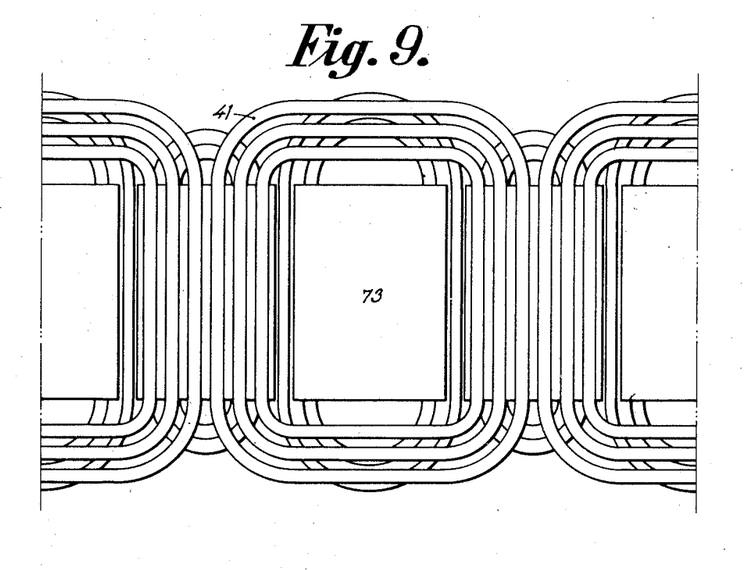
Figure 9 is a developed detail view of the poll face of the machine shown in Figure 8.

In Figures 8 and 9 a pole pitch of the excitation generator 7 is shown diagrammatically in developed form. The main poles 73 are provided with the above mentioned windings 48, 38 and 55. The auxiliary poles are provided with the two excitations windings 47 and 59 which surround the entire core 74 of the shielding pole. In axial slots 75 in the pole face 76 of the auxiliary pole the compensation winding 41 is disposed. As seen in Figure 9 the magnetic axis of the compensation winding 41 coincides with the centre of the main pole 73. The reason for this disposition is, as above alluded to, that the excitation current in the transformers is displaced ninety degrees in phase in relation to the voltage and that the armature reaction accordingly is purely counter-magnetizing. The pole face 76 is preferably provided with a copper plate 79 or other suitable device for damping those higher harmonics of the magnetomotive force of the armature winding which rotate in relation to the poles.

In the preceding description, the application of auxiliary poles has been treated with reference to synchronous machines which carry a substantially inductive or reactive current, such as excitation and commutation generators. The invention is, however, also of considerable interest in synchronous generators or motors the load of which is substantially active and in which the current of the armature conductors accordingly reaches its maximum amplitude when the corresponding main pole is positioned opposite said conductors. In the following a two-phase or multiphase synchronous machine will be described as an example in which the induced windings cooperate with a number of commutators for the rectification of the induced alternating voltages. It is often a desideratum that the induced alternating voltages should have definite zero voltage intervals during which each winding is short circuited by one commutator and alternating currents passing through the winding are commutated and the alternating voltages rectified, which latter may be used to obtain a substantially constant continuous voltage through the series-connection of the commutators, it being presupposed that the wave form of the voltage is suitable for this purpose.

It has been previously proposed, for instance in the U. S. Pat. No. 1,916,240, to use trapezoidal wave form of the induced voltage, the zero voltage intervals being of equal duration as the constant voltage intervals. Through superposition of two such alternating voltages mutually displaced ninety degrees in phase a constant continuous voltage may be derived.

According to the invention the auxiliary poles disposed between the main poles in synchronous machines of the type set forth may be brought to operate as shielding poles and/or commutation poles, which latter have for their specific purpose to induce the auxiliary voltages necessary for the commutation in the winding or windings being short circuited at a given moment.

Figure 10:
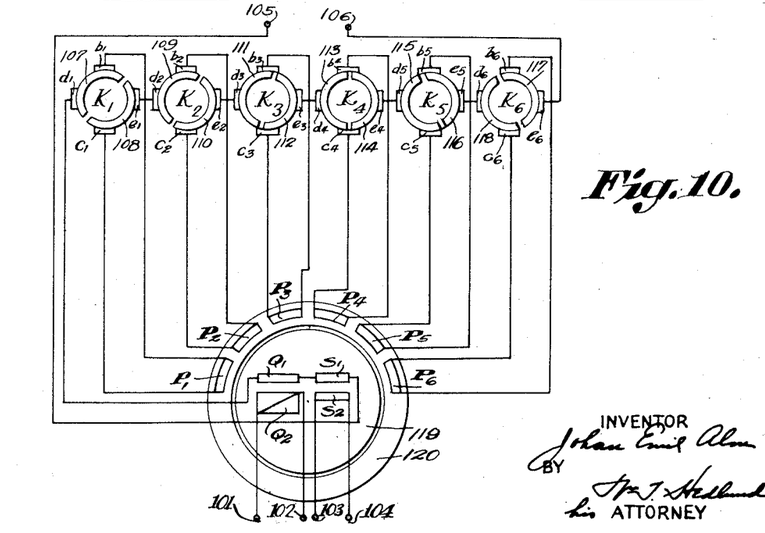
Figure 10 is a schematic diagram showing another embodiment of the invention.

In the arrangement shown in Figure 10 a synchronous generator or motor is provided with six induced windings $P_1$ to $P_6$. Each of these windings is associated with two brushes $b_1$, $c_1$ and $b_2$, $c_2$ etc. which each bear against one commutator $K_1$ to $K_6$. These commutators have each two segments 107, 108 and 109, 110 etc. which in the rotation of the commutator connects for instance the brushes $b_1$, $c_1$ alternately with the brushes $d_1$, $e_1$. Provided the commutator $K_1$ rotates half a revolution for each cycle of the alternating voltage and more particularly in such a manner that the brushes $b_1$, $c_1$ and $d_1$, $e_1$ short-circuit the two segments during the zero voltage intervals of the voltage induced in the winding $P_1$, the alternating voltage impressed upon the brushes $b_1$, $c_1$ is rectified to a continuous voltage between the brushes $d_1$, $e_1$. In the same manner the induced winding $P_2$ cooperates with the commutator $K_2$ et cetera. As is seen from the figure the different commutators are mutually angularly displaced corresponding to the different phase angles of the different armature windings. As the generated voltages constitute a six phase voltage system the phase windings $P_1$ to $P_6$ may be so arranged that voltages induced in two and two of the phase windings, such as $P_1$ and $P_4$, $P_2$ and $P_5$, and $P_3$ and $P_6$, are mutually displaced in phase ninety degrees. Then the appertaining commutators taken two and two, such as $K_1$ and $K_4$, $K_2$ and $K_5$, and $K_3$ and $K_6$, should be mutually displaced forty five mechanical degrees. In the embodiment shown it is further assumed that the phase displacement between consecutive phases is thirty degrees corresponding to a displacement of consecutive commutators of fifteen mechanical degrees.

The windings in this diagram are, of course, only diagrammatically shown and in practice they are preferably evenly distributed on the periphery of the stator. In the diagram they are, however, shown in the manner indicated to illustrate the mutual phase displacement between different windings on the assumption that the machine in question is of the two pole type. In the following the nature of the windings will be more closely described.

On the drawings the rotor 119 is provided with ordinary field poles and intermediate auxiliary poles. In the diagram, the windings appertaining to one pole and one auxiliary pole are shown. On the field poles there are accordingly provided an ordinary excitation winding $Q_2$ fed with current in suitable manner from a current source indicated by 101, 102. The pole shoes are so shaped and the windings $Q_2$ so energized that the machine at no load has a voltage of desired wave form and amplitude.

The voltage wave form is influenced at no load by the straying of the induction flux in the pole spaces. If there were only main poles it would not be possible to establish a zero voltage zone of desired duration. For this purpose shielding of the magnetic lines of force will be necessary which may be caused by the above mentioned auxiliary poles which at no load operate as shielding poles. At load the influence of the so called armature reaction appears, i. e. the magnetomotive force caused by the armature winding which must be compensated by means of the above auxiliary windings and by means of short-circuited damping or attenuation windings of different kinds. At the same time the shielding poles may operate as commutation poles in accordance with the described embodiment.

The commutators $K_1$ to $K_6$ are series-connected on their direct current sides whereby the voltage impulses rectified by the different commutators are superposed or added to a substantially constant continuous voltage, which will prevail between the terminals 105, 106. In this direct current circuit between the brush $d_1$ and the point 105 that portion of the auxiliary windings is included which requires an excitation proportional to the load. Said windings consist of a winding $Q_1$ disposed in slots of the main poles and a winding $S_1$ series-connected therewith and disposed in slots on the auxiliary poles. Further a so-called adjusting winding $S_2$ may be inserted in the slots of the auxiliary poles, the feeding of which winding may be adjusted manually or automatically from a suitable current source 103, 104. Of said windings the winding $Q_2$ has a magnetic axis coinciding with the centre of the main pole whereas the magnetic axis of the windings $Q_1$, $S_1$, and $S_2$ coincides with the centre of the auxilary pole.

At no load the system operates in such a manner that all the rectified voltages are added or superposed to a continuous voltage, which at a correct shaping of the poles, will be practically constant. As soon as the machine is loaded, however, current will flow through the armature windings in the stator 120. Said windings cause a certain magnetomotive force which deforms the induction flux more or less and thus the wave form of the induced voltage. The winding $Q_1$ is so dimensioned that, upon its being passed by the direct current, a magnetomotive force of a direction opposite to that of the armature winding is caused whereby the deformation of the induction curve opposite the main pole is counteracted or eliminated. As soon as the machine is loaded and accordingly alternating current passes through the different induced windings, commutation difficulties arise in reversing the current for the reason that the current, on account of the inductance of the coil short-circuited for the time being, does not reverse voluntarily. The windings $S_1$ disposed on the auxiliary poles have therefore for their purpose to induce a suitable auxiliary or commutation voltage in the short-circuited coil of such a direction, amplitude, and duration that the current is brought to reverse and reach its correct amplitude in the new direction at the end of the commutation period. The object of the adjusting winding $S_2$ will be explained in the following.

In the above it has been assumed that the machine operates as a generator although it, of course, also may operate as a motor. In the latter case the currents of the armature winding will have opposite directions whereby the magnetomotive force of the armature winding is reversed but is also in its new direction counteracted by the compensation winding $Q_1$ passed by current in opposite direction. Similar conditions relate also to the commutation winding $S_1$.

Figure 11:
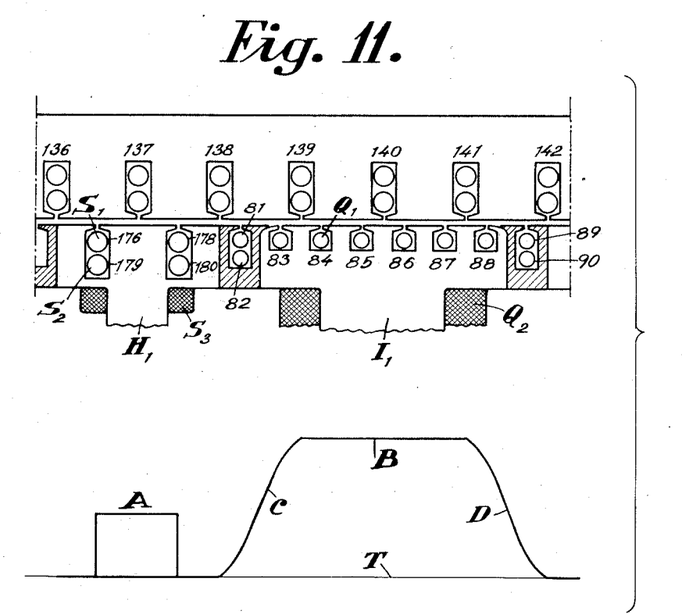
Figures 11 to 14 are detail views of the generator shown in Fig. 10.
Figure 12:
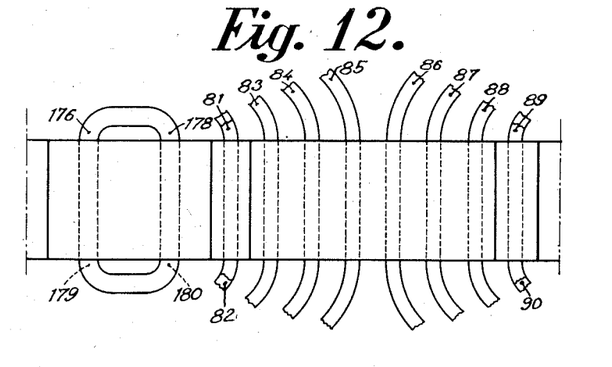

In Figures 11 and 12 the principal disposition of the windings is illustrated in a developed diagram. As seen in Figure 11 the windings $Q_2$ are in the form of ordinary excitation windings surrounding the pole cores $I_1$ proper. The compensation windings $Q_1$ are, on the other hand, formed as slot windings of a nature disclosed in the following and comprise in the shown example ten conductor groups 81 to 90 symmetrically and uniformly disposed in relation to the pole shoe. Six of said conductor groups, i. e. 83 to 88, are disposed in the pole shoe proper and the remaining four conductor groups, i. e. 81, 82 and 89, 90, outside the pole shoe proper and in the interspace between the main pole $I_1$ and the auxiliary pole $H_1$. The magnetic axis of the winding coincides with the centre of the auxiliary pole $H_1$. The compensation winding will thus include in total ten conductors or conductor groups. Thereby a neutralization of the magnetomotive force caused by ten armature conductors, such as those disposed in the five slots 138 to 142, is rendered possible. In the slot 137 there are simultaneously two conductors in which commutation takes place.

The windings $S_1$ and $S_2$ of the auxiliary poles are in the shown example both of the slot winding type and are both disposed quite close to the edges of the pole shoe of the auxiliary pole $H_1$. The winding $S_1$ comprises the two conductor groups 176 and 178 whereas the winding $S_2$ comprises the conductor groups 179, 180. The magnetic axis of said windings coincides accordingly also with the centre of the auxiliary pole $H_1$. The slot winding of the stator is arranged with two coil groups or conductors per slot. Each pole pitch comprises six slot pitches 136 to 142 and accordingly twelve coil groups or conductors. Hence the arrangement of the armature conductors in a so-called cylinder winding as well as a symmetrical disposition of the different induced windings is rendered possible. There is also an additional adjusting winding $S_3$ provided on the cores of the auxiliary poles $H_1$ in Figure 11.

In Figure 10 it has been presupposed that the width of the commutator brushes is so selected in relation to the segment pitch that continuously two commutators, i. e. also two windings, are simultaneously short-circuited. For the sake of simplicity it has, however, been assumed in Figure 11 that only one of the phase windings is being short-circuited at a time. It is generally a desideratum to obtain a so called rectilinear commutation, i. e. that the curve indicating the relation between amperage and time in the short-circuited coil consists of a substantially straight line connecting the amplitude of the current prior to commutation with the amplitude of the current of opposite direction after commutation. This object may generally be obtained through the rectangular wave form A of the commutation flux shown in Figure 11. As one of the coils is always under commutation, for rectilinear commutation the variation per time unit of the commutating current in armature conductors opposite the commutation poles will always be constant, for which reason the required commutation voltage will be constant if the influence of ohmic resistances in the commutating circuit is neglected. As seen from Figure 11, the extreme ends of the commutation flux A are to be found opposite the two conductors 176, 178. The compensation winding should be so dimensioned that the air gap induction under the portions of the commutation pole outside the windings 176, 178 is equal to zero in which case the auxiliary pole in those portions only operates as a shielding pole. If this is not obtainable with a sufficient degree of accuracy the desired result may also be obtained with the aid of the additional adjustment winding $S_3$.

The field of the main pole is of a general trapezoidal form B. The transitional curve portions C and D between the constant amplitude intervals and the zero intervals should have the form indicated in Figure 11.

Figure 13:
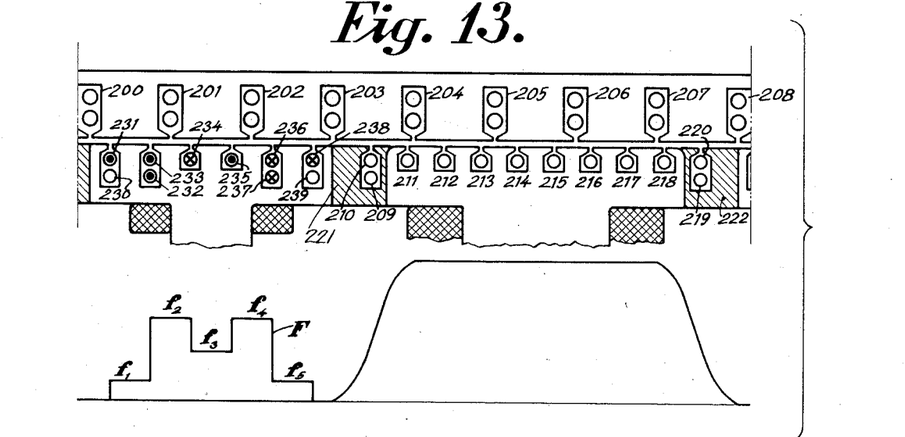
Figure 14:
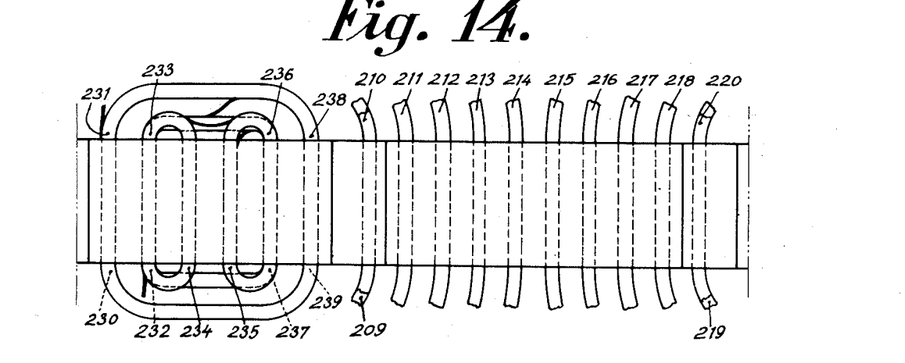
Figure 15:
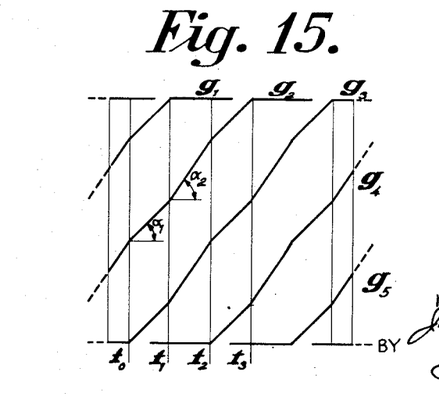
Figure 15 is a diagram illustrating the operation thereof.

It has above been assumed that either two or one of the coils simultaneously are short-circuited. On the other hand, if the number of simultaneously commutating coils during the rotation of the machine fluctuates between for instance two and three and thus on an average is constituted by a broken or fractional number the conditions will be more complicated. In Figures 13 to 15 the conditions in a machine having eight phases are illustrated in which are armature winding is disposed in eight slots, such as 201 to 208, in each pole pitch. In this case it is assumed that the compensation winding of the main pole comprises twelve conductors 209 to 220, of which two conductor pairs 209, 210 and 219, 220 are disposed outside the pole shoe proper in a non-magnetic intermediate piece 221, 222. This piece may simultaneously serve as a holding member. The conductors in the pole shoe are thus adequate to compensate the armature reaction caused by the conductors in the six slots 203 to 208.

In order to obtain as favourable commutation conditions as possible the commutating current should always be constant. For this purpose the commutation may proceed at a slower rate when three conductors or conductor groups commutate simultaneously and more rapidly when only two conductors or conductor groups commutate at the same time.

In Figure 15 it is shown how the commutation proceeds in five consecutive coils $g_1$ to $g_5$. During the interval $t_0$ to $t_1$ commutation takes place simultaneously in the three coils $g_1$, $g_2$ and $g_3$, the commutation pole then enforcing a current reversal, the rapidity of which is indicated by the inclination angle $\alpha_1$. During the following intervals $t_1$ to $t_2$ the commutation proceeds only in the two coils $g_2$ and $g_3$ at about fifty percent increased rapidity in conformity with the inclination angle $\alpha_2$. In the next instant $t_2$ to $t_3$ three coils commutate simultaneously, for which reason the commutation now again proceeds more slowly et cetera. Hence a commutation curve is obtained in the form of a slightly broken line which, however, does not deviate to any appreciable degree from a straight line.

The wave form of the commutation flux required to enforce a commutation process according to Figure 15 is indicated by F in Figure 13. This field curve comprises two comparatively low portions $f_1$, $f_5$, two portions of a comparatively high amplitude $f_2$, $f_4$, and a portion of average amplitude $f_3$. To produce such a field two conductors 231, 238 may, for instance, be provided which are passed by current of opposite directions and which together cause a magnetomotive force, the size of which corresponds to the portions $f_1$, $f_5$. Further a coil containing the conductors 232, 237 is provided which increases the magnetomotive force to a value corresponding to the portion $f_3$. Further two coils 233, 234 and 235, 236 are provided, the relative current direction of which is seen in the figure, a cross designating for instance a current directed from the observer whereas a point designates a current directed towards the observer. In this manner two limited fields are further caused which correspond to the high portions $f_2$, $f_4$ of the magnetomotive force. With such a wave form of the magnetomotive force it is possible to obtain a commutation according to Figure 15.

As the conditions become considerably more complicated in this case the machine should preferably be so designed that the same number of coils always commutate simultaneously, by way of example, in accordance with the conditions relating to Figures 11 and 12.

The disposition of auxiliary poles formed according to the invention to form magnetic shielding elements for preventing undesirable leakage of magnetic flux, if desired, in combination with damping circuits for amplifying their action and/or compensation windings for neutralizing the armature reaction, may be applied to all machines or systems having commutators or other rectifiers, such as mercury rectifiers, which are adapted to operate with main or auxiliary voltages having a definite wave form, such as definite zero voltage intervals. By the term auxiliary voltages is understood in this connection such voltages as are introduced for the purpose of preventing an unsatisfactory operation of the commutator or rectifier, such as sparking, an undesirable deformation of the rectified voltage or the like. As examples of such voltages, voltages for commutation, excitation, covering or compensation of losses and drops of voltages of different kinds, et cetera may be mentioned.

In the above it has been assumed that the field poles are disposed on the rotor of the machine whereas the armature with its induced windings has been disposed on the stator. It is, however, possible according to rules known in the art of electro-technics to dispose the induced windings on the rotor and the field poles on the stator without departing from the inventive idea.

I claim:—

1. An electrical system comprising a plurality of static transformers having primary and secondary windings, commutators associated with at least one of said windings for the rectification of the alternating voltages induced therein, and an auxiliary heteropolar reactive current generator adapted to supply energy to said transformers, said generator having main field poles and auxiliary intermediate poles and being adapted to neutralize the reactive current components in the primary commutator circuits.

2. An electrical system comprising a plurality of static transformers having primary and secondary windings, commutators associated with at least one of said windings for the rectification of the alternating voltages induced therein, exciting windings in induced relationship to said transformers, and an auxiliary heteropolar alternating current generator having armature windings supplying exciting current to said exciting windings, said generator having main field poles and auxiliary intermediate poles and being adapted to neutralize the reactive current components in the commutator circuits.

3. An electrical system comprising a plurality of static transformers having primary and secondary windings, commutators associated with at least one of said windings for the rectification of the alternating voltages induced therein, a plurality of said commutators being connected in series to form a main direct current circuit, an auxiliary heteropolar alternating current generator adapted to supply excitation energy to said transformers, said generator having main field poles and auxiliary intermediate poles and being adapted to neutralize the reactive current components in the commutator circuits, and compensating windings in induced relationship to said main poles in series with one of said direct current circuits to adjust the generator voltage according to load conditions.

4. An electrical system comprising a plurality of static transformers having primary and secondary windings, commutators associated with at least one of said windings for the rectification of the alternating voltages induced therein, means to supply excitation energy to said transformers and a heteropolar reactive current generator having main field poles and auxiliary poles and being adapted to induce the necessary commutation voltages in the primary commutator circuits.

5. An electrical system comprising a plurality of static transformers having primary and secondary windings, commutators associated with at least one of said windings for the rectification of the alternating voltages induced therein, a plurality of said commutators being connected in series to form a main direct current circuit, means to supply excitation energy to said transformers, a heteropolar commutation generator having armature windings included in the circuits of said transformer windings and having main poles and intermediate poles for inducing the alternating voltages required in the generator windings to improve commutation in said winding circuits, and windings disposed on said main poles and included in series with one of said direct current circuits to vary the commutation voltage according to load conditions.

6. An electrical system comprising a plurality of static transformers having primary and secondary windings, commutators associated with at least one of said windings for the rectification of the alternating voltages induced therein, an auxiliary heteropolar reactive current generator adapted to supply energy to said transformers, said generator having main field poles and auxiliary intermediate poles and being adapted to neutralize the reactive current components in the commutator circuits, compensation windings disposed on said auxiliary poles to compensate for reactive armature reaction, and direct current supply means for energizing said compensation windings in proportion to the armature alternating current.

7. An electrical system comprising a plurality of static transformers having primary and secondary windings, commutators associated with at least one of said windings for the rectification of the alternating voltages induced therein, a plurality of said commutators being connected in series to form a main direct current circuit, an auxiliary heteropolar reactive current generator adapted to supply energy to said transformers, said generator having main field poles and auxiliary intermediate poles and being adapted to neutralize the reactive current components in the commutator circuits, compensation windings included in series with one of said direct current circuits and disposed on said auxiliary poles to compensate for reactive armature reaction.

8. An electrical system comprising a plurality of static transformers having primary and secondary windings, commutators associated with at least one of said windings for the rectification of the alternating voltages induced therein, an auxiliary heteropolar reactive current generator adapted to supply energy to said transformers, said generator having main field poles and auxiliary intermediate poles and being adapted to neutralize the reactive current components in the commutator circuits, exciting windings disposed on said main poles, compensation windings disposed on said auxiliary poles to compensate for reactive armature reaction, and a direct current supply circuit including said excitation and compensation windings in series.

9. An electrical system comprising a plurality of static transformers having primary and secondary windings, commutators associated with at least one of said windings for the rectification of the alternating voltages induced therein, a plurality of said commutators being connected in series to form a main direct current circuit, an auxiliary heteropolar alternating current excitation generator having armature windings adapted to supply excitation energy to said transformers, main field poles and intermediate poles provided in said excitation generator for inducing the alternating voltages required in the armature windings to cause the necessary alternating flux in the transformers, an alternating current commutation generator having armature windings included in the circuits of said transformer windings and having main poles and auxiliary intermediate poles adapted to improve commutation in said primary windings, and magnetization windings disposed on said auxiliary poles of said excitation generator and included in one of said direct current circuits for causing an auxiliary flux in the transformers at load to assist commutation in the secondary winding circuits.

10. An electrical system comprising a plurality of static transformers having primary and secondary windings, commutators associated with at least one of said windings for the rectification of the alternating voltages induced therein, an auxiliary heteropolar alternating current generator adapted to supply excitation energy to said transformers, said generator having main field poles and auxiliary intermediate poles and being adapted to neutralize the reactive current components in the commutator circuits, windings disposed on said auxiliary poles, and a direct current supply circuit for producing a fixed excitation of said last winding.

11. An electrical system comprising a plurality of static transformers having primary and secondary windings, commutators associated with at least one of said windings for the rectification of the alternating voltages induced therein, an auxiliary heteropolar alternating current generator adapted to supply excitation energy to said transformers, said generator having main field poles and auxiliary intermediate poles and being adapted to neutralize the reactive current components in the commutator circuits, windings disposed on said auxiliary poles, a relay operated by impulses occurring upon incorrect operation, and a direct current supply circuit supervised by said relay and controlling said windings.

12. An electrical system comprising a plurality of static transformers having primary and secondary windings, commutators associated with at least one of said windings for the rectification of the alternating voltages induced therein, an auxiliary heteropolar alternating current generator adapted to supply excitation energy to said transformers, said generator having main field poles and auxiliary intermediate poles and being adapted to neutralize the reactive current components in the commutator circuits, windings disposed on said auxiliary poles, divided brushes associated with said commutators, a relay controlled by said divided brushes, and a direct current supply circuit supervised by said relay and controlling said auxiliary pole windings.

13. An electrical system comprising a plurality of static transformers having primary and secondary windings, commutators associated with at least one of said windings for the rectification of the alternating voltages induced therein, an auxiliary heteropolar reactive current generator adapted to supply energy to said transformers, said generator having main field poles and auxiliary intermediate poles and being adapted to neutralize the reactive current components in the commutator circuits, windings disposed on said main poles, a relay operated by impulses occurring upon incorrect operation, and a direct current supply circuit supervised by said relay and controlling said main pole windings.

14. An electrical system comprising a plurality of static transformers having primary and secondary windings, commutators associated with at least one of said windings for the rectification of the alternating voltages induced therein, an auxiliary heteropolar reactive current generator adapted to supply energy to said transformers, said generator having main field poles and auxiliary intermediate poles and being adapted to neutralize the reactive current components in the commutator circuits, windings disposed on said main poles, a relay operated by deviation impulses caused by reactive current components in the commutator circuits, and a direct current supply circuit supervised by said relay and controlling said main pole windings.

15. An electrical system comprising a plurality of static transformers having primary and secondary windings, commutators associated with at least one of said windings for the rectification of the alternating voltages induced therein, an auxiliary heteropolar reactive current generator adapted to supply energy to said transformers, said generator having main field poles and auxiliary intermediate poles and being adapted to neutralize the reactive current components in the commutator circuits, windings disposed on said main poles, divided brushes associated with said commutators, a relay controlled by said divided brushes, and a direct current supply circuit supervised by said relay and controlling said main pole windings.

16. An electrical system comprising a plurality of static transformers having primary and secondary windings, commutators associated with at least one of said windings for the rectification of the alternating voltages induced therein, an auxiliary heteropolar alternating current generator adapted to supply excitation energy to said transformers, said generator having main field poles and auxiliary intermediate poles and being adapted to neutralize the reactive current components in the commutator circuits, windings disposed on said main poles, and a relay responding to unsatisfactory operation and adapted to control said main pole windings.

17. An electrical system comprising a plurality of static transformers having primary and secondary windings, commutators associated with at least one of said windings for the rectification of the alternating voltages induced therein, a plurality of said commutators being connected together to form one or more main direct current circuits, an auxiliary heteropolar alternating current generator adapted to supply excitation energy to said transformers, said generator having main field poles and auxiliary intermediate poles and being adapted to neutralize the reactive current components in the commutator circuits, separately excited main windings disposed on said main poles, and negative compound windings counter-acting said main windings and included in series with one of said main circuits to adjust the generator voltage according to load conditions.

18. An electrical system comprising a plurality of induced windings carrying mutually phase displaced voltages, commutators associated with at least one of said induced windings, means associated with one of said commutators for deriving rectified deviation impulses from the commutator, an auxiliary primary winding associated with said brush arrangement, an auxiliary secondary winding in induced relationship with said primary winding, a relay controlled circuit associated with said secondary winding, and means supervised by said relay circuit and controlling the operation of said system.

19. An electric machine comprising a plurality of induced windings carrying mutually phase displaced voltages, commutators each associated with one of said induced windings, means for deriving rectified deviation impulses from the commutators, an auxiliary primary winding associated with said means, an auxiliary secondary winding in induced relationship with said primary winding, a relay controlled circuit associated with said secondary winding, a synchronous switch controlling said circuit, and means supervised by said relay circuit and controlling the operation of the system.

20. An electric machine comprising a number of induced windings having mutually phase displaced voltages induced therein, commutators associated with said windings for short-circuiting said windings during definite time intervals and rectifying the induced voltages during such intervals, and a heteropolar commutation generator having main field poles and auxiliary poles and being adapted to induce the necessary commutation voltages in the commutator circuits.

21. An electric machine comprising a heteropolar alternating current machine having a plurality of angularly displaced induced windings, main field poles and intervening auxiliary poles, a plurality of commutator circuits each controlled by one of said induced windings, a direct current circuit, a plurality of commutators included in series in said direct current circuits and each associated with one of said commutator circuits.

22. An electrical system comprising a plurality of static transformers having primary and secondary windings, a commutator associated with at least one of said windings for the rectification of the alternating voltages induced therein, a plurality of said commutators being connected in series to form a main direct current circuit, an auxiliary heteropolar alternating current excitation generator having armature windings adapted to supply excitation energy to said transformers, main field poles and intermediate poles provided in said excitation generator for inducing the alternating voltages required in the alternating flux in the transformers and magnetization windings disposed on said auxiliary poles of said excitation generator and included in one of said direct current circuits for causing an auxiliary flux in the transformers at load to assist commutation.

23. An electrical system comprising a plurality of static transformers having primary and secondary windings, commutators associated with at least one of said windings for the rectification of the alternating voltages induced therein, and an auxiliary heteropolar reactive current generator having main field poles and auxiliary intermediate poles, said generator being adapted to neutralize the reactive current component in the commutator circuits, excitation windings disposed on said main poles and compensation windings disposed on said auxiliary intermediate poles, said compensation windings being connected in series with said excitation windings and being adapted to compensate for reactive armature reaction, and negative compound windings disposed on said main poles, said last mentioned windings being included in series with one of the commutator circuits and being adapted to adjust the generator voltage occurring at load conditions.

24. An electrical system comprising a plurality of static transformers having primary and secondary windings, commutators associated with at least one of said windings for the rectification of the alternating voltages induced therein, an auxiliary heteropolar reactive current generator having main field poles and auxiliary intermediate poles, said generator being adapted to neutralize the reactive current component in the commutator circuits, excitation windings disposed on said main poles and compensation windings disposed on said auxiliary intermediate poles, said compensation windings being connected in series with said excitation windings and being adapted to compensate for reactive armature reaction, negative compound windings disposed on said main poles, said last mentioned windings being included in series with one of the commutator circuits and adapted to adjust the generator voltage occurring at load conditions, and magnetizing windings disposed on said auxiliary poles and connected in series with said last mentioned windings for causing an auxiliary flux in the transformers at load to assist commutation.

25. An electrical system comprising a plurality of static transformers having primary and secondary windings, commutators associated with at least one of said windings for the rectification of the alternating voltages induced therein and an auxiliary heteropolar reactive current generator having main field poles and auxiliary intermediate poles, said generator being adapted to neutralize the reactive current component in the commutator circuits, excitation windings disposed on said main poles, compensation windings disposed on said auxiliary poles, said compensation windings being connected in series with said excitation windings and being adapted to compensate for reactive armature reaction, negative compound windings disposed on said main poles, said last mentioned windings being included in series with one of the commutator circuits and adapted to adjust the generator voltage occurring at load conditions, additional windings disposed on said main poles and means to energize said additional windings in accordance with deviations of the transformers from predetermined operating conditions so as to correct commutation at load.

26. An electrical system comprising a plurality of static transformers having primary and secondary windings, commutators associated with at least one of said windings for the rectification of the alternating voltages induced therein and an auxiliary heteropolar reactive current generator having main field poles and auxiliary intermediate poles, said generator being adapted to neutralize the reactive current component in the commutator circuits, excitation windings disposed on said main poles and compensation windings disposed on said auxiliary intermediate poles, said compensation windings being connected in series with said excitation windings and being adapted to compensate for reactive armature reaction, negative compound windings disposed on said main poles, said last mentioned windings being included in series with one of the commutator circuits and adapted to adjust the generator voltage occurring at load conditions, magnetizing windings disposed on said auxiliary poles and connected in series with said last mentioned windings for causing an auxiliary flux in the transformers at load to assist commutation, additional windings disposed on said main poles and means to energize said additional windings in accordance with deviations of the transformers from predetermined operating conditions so as to correct commutation at load.

27. An electrical system comprising a plurality of static transformers having primary and secondary windings, commutators associated with at least one of said windings for the rectification of the alternating voltages induced therein and an auxiliary heteropolar reactive current generator having main field poles and auxiliary intermediate poles, said generator being adapted to neutralize the reactive current component in the commutator circuits, excitation windings disposed on said main poles and compensation windings disposed on said auxiliary intermediate poles, said compensation windings being connected in series with said excitation windings and being adapted to compensate for reactive armature reaction, negative compound windings disposed on said main poles, said last mentioned windings being included in series with one of the commutator circuits and adapted to adjust the generator voltage occurring at load conditions, magnetizing windings disposed on said auxiliary poles and connected in series with said last mentioned windings for causing an auxiliary flux in the transformers at load to assist commutation, additional windings disposed on said main poles and means to energize said additional windings in accordance with deviations of the transformers from predetermined operating conditions so as to correct commutation at load, corrective windings disposed on said auxiliary poles, and means for energizing said last mentioned windings in accordance with deviation impulses derived from the commutators associated with the secondary of said transformers so as to correct the secondary commutation.

28. An electrical system comprising a plurality of static transformers having primary and secondary windings and means for rectifying the alternating voltages induced therein, and an auxiliary heteropolar reactive current generator adapted to supply reactive current to said transformers, said generator having means to compensate for the armature reaction caused by the reactive current therein and having additional means controlled by varying conditions of load and commutation to compensate for deviations in transformer characteristics so as to neutralize the reactive current components in the commutation circuits.

29. An electrical system comprising a plurality of static transformers having primary and secondary windings and means for rectifying the alternating voltages induced therein, and an auxiliary heteropolar reactive current generator adapted to supply reactive current to said transformers, said generator having means to compensate for the armature reaction caused by the reactive current therein, means controlled by load conditions to compensate for variations produced by the load and means controlled by deviations from correct commutation to compensate for said deviations whereby the generator is caused to neutralize the reactive current components in the commutation circuits and to supply substantially the entire magnetization energy for said transformers.

30. An electrical system comprising a plurality of static transformers having primary and secondary windings and means for rectifying the alternating voltages induced therein, and an auxiliary heteropolar reactive current generator adapted to supply reactive current to said transformers, said generator having main field poles and auxiliary intermediate poles, a main field winding disposed on said main poles, a compensating winding disposed in the pole faces of said intermediate poles and connected in series with said first winding to compensate for the armature reaction produced by the reactive current therein, means associated with said main poles to vary the excitation in accordance with load conditions, and additional means associated with said main poles to vary the excitation in accordance with the differential energy in the primary and secondary circuits so as to cause said generator to supply substantially the entire reactive current energy to said transformers.

31. A direct current transformer system comprising a plurality of static transformers having primary and secondary windings, commutators associated with each of said windings for the rectification of the alternating voltages induced therein, an auxiliary heteropolar reactive current generator adapted to supply energy to said transformers, said generator having main field poles and auxiliary intermediate poles and being adapted to neutralize the reactive current components in the commutator circuits, windings disposed on said main poles and on said intermediate poles, means for energizing said windings in accordance with load conditions to cause said generator to supply energy to assist commutation, and means to compensate for armature reaction in said generator caused by the reactive current therein.

32. A direct current transformer system comprising a plurality of static transformers having primary and secondary windings, commutators associated with each of said windings for the rectification of the alternating voltages induced therein, an auxiliary heteropolar reactive current generator adapted to supply energy to said transformers, said generator having main field poles and auxiliary intermediate poles and being adapted to neutralize the reactive current components in the commutator circuits, windings disposed on said main poles and on said intermediate poles, means for energizing said windings in accordance with load conditions to cause said generator to supply energy to assist commutation, means to compensate for armature reaction in said generator caused by the reactive current therein, and additional means to vary the excitation of said generator in accordance with deviation impulses which arise upon incorrect commutation.

33. An electrical system comprising a plurality of static transformers having primary and secondary windings, commutators associated with at least one of said windings for the rectification of the alternating voltages induced therein, an auxiliary heteropolar reactive current generator adapted to supply excitation energy to said transformers, means associated with said generator to correct the excitation thereof in accordance with variations in conditions of load and commutation, and a commutation generator adapted to supply energy in the commutation circuits to assist commutation, said last mentioned generator having means controlled in accordance with the load to vary the excitation thereof to compensate for the armature reaction thereof, and to adjust the excitation thereof in response to deviations from correct commutation.

34. An electrical system comprising a plurality of static transformers having primary and secondary windings, commutators associated with at least one of said windings for the rectification of the alternating voltages induced therein, an auxiliary heteropolar reactive current generator adapted to supply excitation energy to said transformers, said generator having main field poles and auxiliary intermediate poles, excitation means associated with said poles adapted to supply excitation energy to cause the generator to neutralize the reactive current component in the transformer circuits, a commutation generator adapted to supply energy to said commutation circuit to assist commutation therein, and means associated with one of said generators and controlled in accordance with variations in load conditions and in accordance with deviations from correct commutation to vary the excitation of said generators so as to correct said deviation and to cause said generators to supply substantially the entire reactive energy to said transformers.

JOHAN EMIL ALM.